May 27, 1969            W. A. HICKOX            3,446,070
INDICATOR FOR SIMULTANEOUSLY INDICATING TWO
INDEPENDENTLY VARIABLE QUANTITIES
Filed Oct. 23, 1967
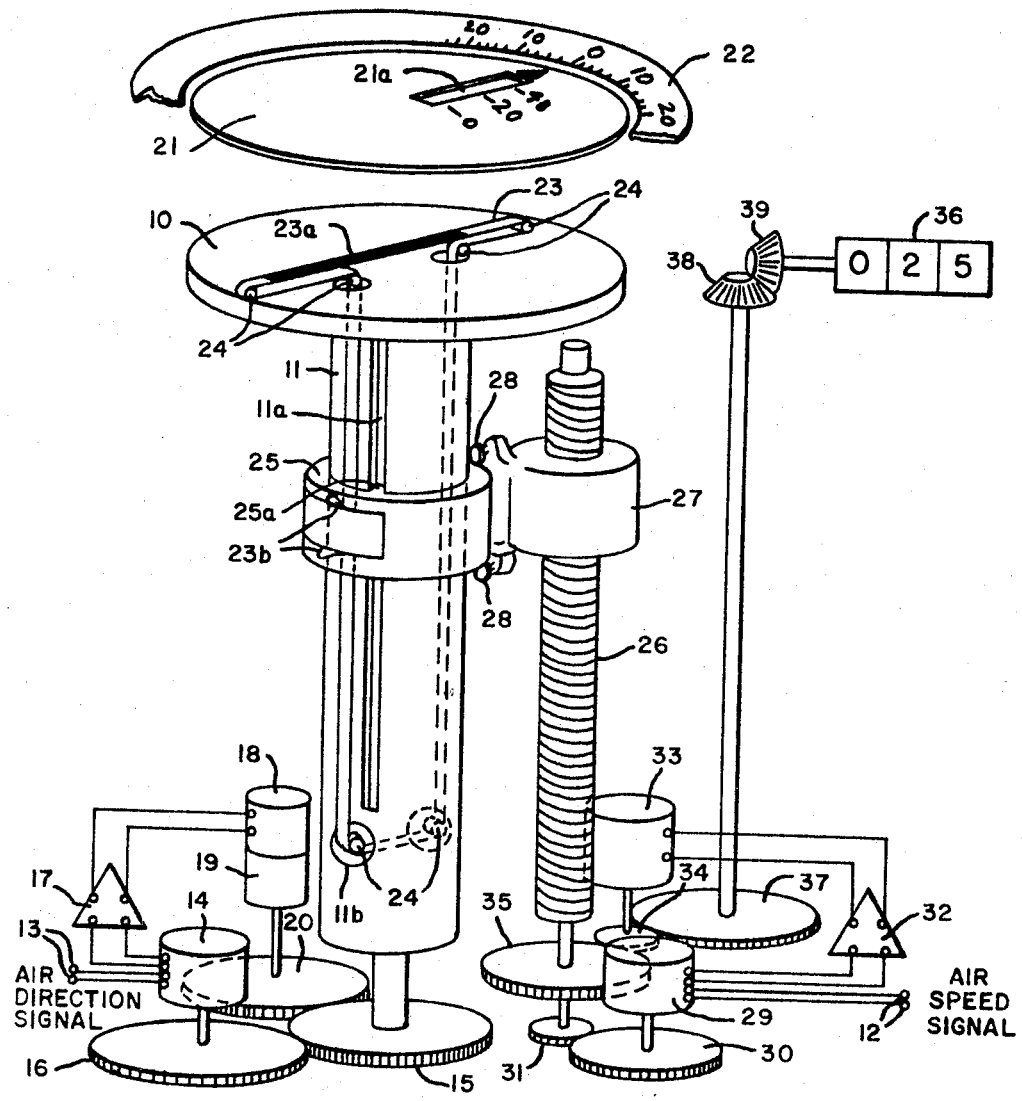

United States Patent Office 3,446,070
Patented May 27, 1969

3,446,070
INDICATOR FOR SIMULTANEOUSLY INDICATING TWO INDEPENDENTLY VARIABLE QUANTITIES
Walter A. Hickox, Glen Cove, N.Y., assignor to Aeroflex Laboratories Incorporated, a corporation of Delaware
Filed Oct. 23, 1967, Ser. No. 677,199
Int. Cl. G01w 1/02
U.S. Cl. 73—189                                     8 Claims

ABSTRACT OF THE DISCLOSURE

An indicator for simultaneously indicating two independently variable electrical signals comprises a rotatable disc supported on a shaft, an electrical servosystem responsive jointly to one of the electrical signals and to the position of the disc member for rotating the disc member to null the servosystem, whereby the position of the disc represents the magnitude of one of the electrical signals. The indicator also includes a translatory endless belt supported on the disc member and including a portion traversing substantially across the face thereof. A collar is supported on the shaft and splined for movement axially thereof and is connected to one pass of the endless belt. A second electrical servosystem, responsive jointly to the other electrical signal and to the position of the endless belt, translates the belt independently of rotation thereof to null its servosystem, the translatory position of the belt thereby indicating the magnitude of such other electrical signal. Portions of the endless belt are of contrasting visual characteristics, for example red or black and white, and the dividing line therebetween is representative of the translatory position of the belt and, thus, of the magnitude of the other electrical signal.

Background of the invention

In the transmission of two independently variable components of a vector quantity, for example wind direction and velocity, from primary sensors to a convenient location for reading or recording, it has been customary to provide a separate instrument for each of the vector components, usually of the analog type. In the navigation of aircraft, such instruments would, of course, be located in the cockpit while the sensors are necessarily supported externally of the craft. However, it is well known that the number of navigational and safety instruments in the cockpit of an aircraft has continuously increased so that it is of utmost importance to minimize the number of instruments required to provide any given information.

It is an object of the invention, therefore, to provide a new and improved indicator for simultaneously indicating two independently variable quantities which is particularly adapted to indicate, in a manner easily comprehended by the pilot, the vector components of air velocity, that is, air speed and direction.

Summary of the invention

In accordance with the invention, there is provided an indicator for simultaneously indicating two independently variable quantities comprising a rotatable disc member, means responsive to one of the quantities for rotating the disc member, and means including such disc member and a stationary member registering therewith for indicating the angular position of the disc member and thereby the magnitude of the one quantity. The indicator further comprises a translatory endless belt supported on the disc member, rotatable therewith, and including a portion traversing substantially across the face thereof, means responsive to the other of the two quantities for translating the endless belt independently of the rotation thereof, and means including the endless belt and a member rotatable therewith for indicating the translatory position of the belt and thereby the magnitude of such other quantity.

For a better understanding of the present invention, together with other and further objects thereof, reference is had to the following description, taken in connection with the accompanying drawing, while its scope will be pointed out in the appended claims.

Brief description of the drawing

The single figure of the drawing is a perspective representation, partially exploded and partially schematic, of an indicator for simultaneously indicating two independently variable quantities and embodying the invention.

Description of the preferred embodiment

An indicator for simultaneously indicating two independently variable quantities, for example two angular position-representative electrical signals, comprises a rotatable disc member 10 supported on a rotatable shaft 11 and means responsive to one of the electrical signals for rotating the disc member 10. The two independently variable electrical signals may comprise an airspeed signal applied to the terminals 12 and an air-direction signal applied to the terminals 13. These signals may be provided by any well-known airspeed and direction sensors, for example from the sensors described and claimed in applicant's copending application Ser. No. 500,613, filed Oct. 22, 1965, now U.S. Patent 3,364,741.

The means described for rotating the disc member 10 is shown as an electrical servosystem responsive jointly to the electrical signals at the terminals 13 and to the position of the disc member 10 and includes a synchro 14 to which the signals 13 are applied and having a rotor driven proportionately to the disc member 10, as by gearing 15, 16, interconnecting the rotor of the synchro 14 and the shaft 11. The output of position-difference signal of the synchro 14 is applied via an amplifier 17 to a servomotor 18 having a gear reduction unit 19, the output shaft of which drives the shaft 11 through gearing 20, 15.

The indicator of the invention further comprises means including the disc member 10 and a stationary member registering therewith for indicating the angular position of the disc member 10 and thereby the magnitude of the electrical signal applied to terminals 13. This means is shown as a masking disc 21 superimposed over the disc member 10 and having a radial indicator slot 21a and an annular stationary member 22 carrying a scale registering with the indicator slot 21a to indicate the angular position of the disc member 10 and, thus, the value of the air-direction signal applied to terminals 13.

The indicator of the invention further comprises a translatory effectively endless belt 23 supported on the disc member 10 as by a series of guide rollers 24 and including a portion traversing substantially diametrically across the face of the disc member 10, as shown. There is also provided a collar 25 supported on the shaft 11 and having a key 25a engaging a key slot 11a of shaft 11 to provide for movement of the collar 25 axially of the shaft 11 while maintaining rotation therewith. The collar 25 is secured to one pass of the effectively endless belt, specifically to the overlapping ends thereof, as indicated at 23b, so as to translate the belt as the collar moves up and down on the shaft 11. The lower end of the belt loop passes through a bore 11b in shaft 11 and around additional guide rollers 24.

The indicator of the invention further comprises means responsive to the other of the input quantities, specifically the airspeed signal applied to the terminals 12, for translating the endless belt 23 independently of the rotation thereof. To this end, there is provided a lead screw 26 driving a nut 27 carrying a pair of rollers 28, 28 engaging opposite faces of the collar 25 so that actuation of the lead screw 26 moves the collar 25 axially of the shaft 11 independently of the rotation thereof. This means further comprises an electrical servosystem responsive jointly to the electrical signals applied to the terminals 12 and to the position of the endless belt for actuating the lead screw 26. Specifically, there is provided a synchro 29 excited by the electrical signals at the terminals 12 and having a rotor driven proportionately to the endless belt 23 by means of gearing 30, 31. The output or position-difference signal of synchro 29 is applied via an amplifier 32 to a servomotor 33 which drives the lead screw 26 through gearing 34, 35.

The indicator of the invention further comprises means including the endless belt 23 and a member rotatable therewith for indicating the translatory position of the belt and thereby the magnitude of the airspeed signal applied to the terminals 12. This latter means includes the masking disc 21 having the radial slot 21a extending from the center of the disc and exposing therethrough the endless belt underneath. As indicated, portions of the belt 23 have contrasting visual characteristics, for example, the portion 23a may be red or black and the remainder of the belt white, the dividing line there-between being representative of the translatory position of the belt 23 and, thus, of the magnitude of the airspeed signal applied to the terminals 12. To assist reading airspeed, a scale may be applied to the disc 21 along one side of the slot 21a, as indicated. If desired, a digital indication of the value of airspeed may be provided by a conventional counter 36 driven by the servomotor through gearing 34, 37 and bevel gearing 38, 39.

It is believed that the operation of the indicator of the invention will be apparent from the foregoing description. Briefly, the signals from the terminals 12 representing variations of airspeed are applied to synchro 29 which, in conventional manner, produces an output or error signal representative of the difference between the position of its rotor and the position-representative input signals. This error signal, amplified in amplifier 32, is applied to servomotor 33 which, through gearing 34, 35, drives the lead screw 26 and the rotor of the synchro to null position, that is, a position in which the electrical output of the synchro 29 is substantially zero. As the lead screw 26 is driven, it drives the nut 27 axially to actuate the collar 25 axially of the shaft 11 and, in so doing, to translate the endless belt 23, the dividing line between the contrasting portions of the belt appearing through the indicator slot 21a so that it can be read from the adjacent scale.

Simultaneously, the air-direction signal applied to terminals 13, energizes the syncho 14 which produces an output or error signal which is applied via amplifier 17 to servomotor 18 which, through gearing 20, 15, rotates the shaft 11, the disc 10 and the mask 21 to an angular position corresponding to that represented by the air-direction signal. At this null point, the output of the synchro 14 is reduced substantially to zero.

Thus, the pilot of a plane carrying an instrument of the type described can, by a single observation, recognize at a glance both the direction and magnitude of the relative airspeed of the craft. In certain craft, the pilot is interested primarily only in relatively low speeds during takeoff and landing. In this event, the instrument can be calibrated so that the dividing line between the contrasting portions of the endless belt 23 traverses the indicator slot 21a completely over such range of relatively low airspeeds, for example from 0 to 50 or 0 to 100 miles per hour. Alternatively, the pilot is provided with a continuous indication of relative airspeed by the digital counter 36 which will ordinarily extend throughout the entire airspeed range of the craft.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An indicator for simultaneously indicating two independently variable quantities compising:
    a rotatable disc member;
    means responsive to one of the quantities for rotating said disc member;
    means including said disc member and a stationary member registering therewith for indicating the angular position of said disc member and thereby the magnitude of said one quantity;
    a translatory endless belt supported on said disc member, rotatable therewith, and including a portion traversing substantially across the face thereof;
    means responsive to the other of said quantities for translating said endless belt independently of the rotation thereof;
    and means including said belt and a member rotatable therewith for indicating the translatory position of said belt and thereby the magnitude of said other quantity.

2. An indicator for simultaneously indicating two independently variable quantities in accordance with claim 1 in which the variable quantities are position-representative electrical signals and the means for rotating said disc member and for translating said endless belt are electrical servosystems, each responsive jointly to one of said electrical signals and to the position of said disc member or said endless belt driven thereby.

3. An indicator for simultaneously indicating two independently variable quantities in accordance with claim 2 in which each of said electrical signals is representative of angular position and in which each of said servosystems includes a synchro excited by one of said signals and having a rotor driven proportionately to the disc member or the endless belt.

4. An indicator for simultaneously indicating two independently variable quantities in accordance with claim 1 in which the endless belt constitutes an indicator of angular position of said disc member and said stationary member carries a scale registering with said indicator.

5. An indicator for simultaneously indicating two independently variable quantities in accordance with claim 4 in which said member rotatable with said belt constitutes a masking disc superimposed on said disc member, said masking disc having a radial indicator slot exposing the endless belt underneath.

6. An indicator for simultaneously indicating two independently variable quantities in accordance with claim 5 in which portions of said endless belt are of contrasting visual characteristics, the dividing line therebetween being representative of the translatory position of said belt and thus the magnitude of said other quantity.

7. An indicator for simultaneously indicating two independently variable quantities in accordance with claim 6 in which said masking disc is provided wth a scale along one side of said slot registering with said dividing line of said endless belt.

8. An indicator for simultaneously indicating two independently variable quantities in accordance with claim 1 in which said disc member is supported on a rotatable shaft and which comprises a collar supported on said shaft for movement axially thereof and secured to one pass of said endless belt, and in which the means responsive to the other of said quantities moves said collar axially of said shaft.

References Cited
UNITED STATES PATENTS

| | | | |
|---|---|---|---|
| 531,669 | 1/1895 | Weston | 116—129 |
| 3,021,814 | 2/1962 | Hyatt | 116—133 |

RICHARD C. QUEISSER, *Primary Examiner.*

J. W. MYRACLE, *Assistant Examiner.*

U.S. Cl. X.R.

116—133, 135, 136.5